(12) United States Patent
Avizonis et al.

(10) Patent No.: US 6,965,469 B2
(45) Date of Patent: Nov. 15, 2005

(54) FIBER AMPLIFIER HAVING A NON-DOPED INNER CORE AND AT LEAST ONE DOPED GAIN REGION

(75) Inventors: Petras V. Avizonis, Laguna Hills, CA (US); James A. Davis, Thousand Oaks, CA (US); David Whelan, Newport Coast, CA (US)

(73) Assignee: The Boeing Company, Chicago, IL (US)

( * ) Notice: Subject to any disclaimer, the term of this patent is extended or adjusted under 35 U.S.C. 154(b) by 441 days.

(21) Appl. No.: 10/300,104

(22) Filed: Nov. 20, 2002

(65) Prior Publication Data

US 2004/0095968 A1    May 20, 2004

(51) Int. Cl.[7] .................................................. H01S 3/00
(52) U.S. Cl. .................................................. 359/341.1
(58) Field of Search ........................... 359/341.1, 334

(56) References Cited

U.S. PATENT DOCUMENTS

| | | | |
|---|---|---|---|
| 3,456,211 A | | 7/1969 | Koester |
| 5,291,501 A | * | 3/1994 | Hanna ............................. 372/6 |
| 5,694,408 A | | 12/1997 | Bott et al. |
| 5,715,270 A | | 2/1998 | Zediker et al. |
| 5,832,006 A | | 11/1998 | Rice et al. |
| 5,847,816 A | | 12/1998 | Zediker et al. |
| 5,867,257 A | | 2/1999 | Rice et al. |
| 5,877,890 A | | 3/1999 | Snitzer |
| 5,946,130 A | | 8/1999 | Rice |
| 5,966,391 A | | 10/1999 | Zediker et al. |
| 6,061,170 A | | 5/2000 | Rice et al. |
| 6,200,309 B1 | | 3/2001 | Rice et al. |
| 6,229,940 B1 | | 5/2001 | Rice et al. |
| 6,240,108 B1 | | 5/2001 | Ionov |
| 6,363,087 B1 | * | 3/2002 | Rice ............................. 372/3 |
| 6,405,567 B1 | * | 6/2002 | Loeb et al. ................... 65/415 |
| 6,507,689 B2 | * | 1/2003 | Tirloni et al. ............... 385/127 |
| 2002/0024727 A1 | | 2/2002 | Wilcox et al. |
| 2002/0030881 A1 | | 3/2002 | Nilsson et al. |

FOREIGN PATENT DOCUMENTS

DE    197 36 155 A1    2/1999

* cited by examiner

Primary Examiner—Mark Hellner
(74) Attorney, Agent, or Firm—Alston & Bird LLP (57) ABSTRACT

A fiber amplifier includes at least one longitudinally extending non-doped inner core capable of transmitting signals. At least partially surrounding the inner core and extending at least partially therealong, the fiber amplifier also includes at least one gain region capable of amplifying signals propagating therethrough. The fiber amplifier also includes an outer core surrounding the gain region and the inner core and extending longitudinally therealong. The outer core is capable of transmitting pump energy such that the pump energy at least partially amplifies signals propagating through the inner core according to a nonlinear amplification process, such as a Raman or a Brillouin amplification process.

26 Claims, 11 Drawing Sheets

IRRADIANCE PATTERNS OF VARIOUS LP MODES

FIBER AMPLIFIER HAVING A NON-DOPED INNER CORE AND AT LEAST ONE DOPED GAIN REGION

FIELD OF THE INVENTION

The present invention relates generally to optical fiber amplifiers and, more particularly, to techniques for coupling pump energy into the pump core layer of an optical fiber amplifier.

BACKGROUND OF THE INVENTION

Laser systems including fiber amplifiers are commonly used in many applications, including telecommunications applications and high power military and industrial fiber optic applications. For example, both U.S. Pat. No. 5,946,130, issued Aug. 31, 1999 to Rice and U.S. Pat. No. 5,694,408 issued Dec. 2, 1997 to Bott et al. describe many such applications in which laser systems including fiber amplifiers are employed including the processing of materials, laser weapon and laser ranging systems, and a variety of medical and other applications. In this regard, such fiber amplifiers generally include optical fibers that passively transmit optical power, fibers that experience or are designed to enhance performance of a laser through nonlinear optical processes such as Raman-shifting and Brillouin scattering, as well as optical fibers that are doped with a lasing ion embedded in the fiber material. For more details of such applications, see U.S. Pat. No. 5,832,006 issued Nov. 3, 1998 to Rice et al., the contents of which are hereby incorporated by reference in its entirety, which describes coherently phasing Raman fibers in a high brightness array. In addition, see U.S. Pat. No. 6,363,087 issued Mar. 26, 2002 to Rice, the contents of which are also incorporated by reference, which describes a multimode Raman fiber amplifier.

Figure 1A:
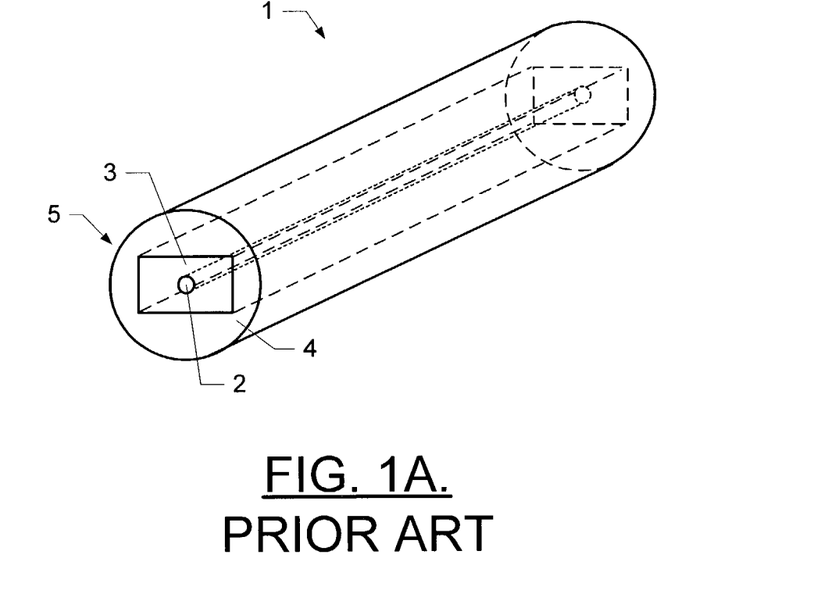
FIGS. 1A and 1B are an orthographic view and a front view, respectively, of a conventional end-pumped dual-clad fiber.
Figure 1B:
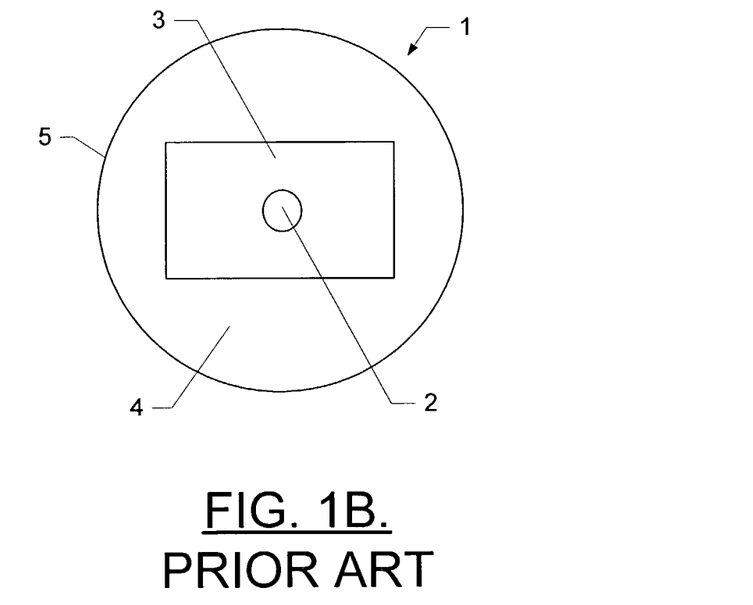

Optical fiber amplifiers are designed to increase the power output levels of the signals propagating therealong. One conventional optical fiber amplifier design is an end-pumped dual-clad fiber, such as that described in U.S. Pat. No. 4,815,079 issued Mar. 21, 1989 to Snitzer et al. Referring to FIGS. 1A and 1B, the dual-clad fiber 1 has a single mode signal core 2, a multi-mode pump core 3 surrounding the signal core, and an outer cladding layer 4 surrounding the pump core for confining pump energy within the pump core such that signals propagating through the signal core are amplified. The signal core will typically be doped with one or more rare earth elements such as, for example, ytterbium, neodymium, praseodymium, erbium, holmium or thulium.

In operation, pump energy is coupled into the pump core 3 at the input end 5 of the fiber. The pump energy then propagates along through the pump core until it is absorbed by the dopant in the signal core 2, thus amplifying signals propagating through the signal core. Although dual-clad fibers 1 can have different sizes, one typical dual-clad fiber includes a signal core that has a diameter of 8–10 $\mu$m and a pump core that has cross-sectional dimensions of 100–300 $\mu$m. End-pumped dual-clad fiber amplifiers of this size can typically reach fiber energy power levels of 100 W.

In general, laser systems can scale arrays of fiber amplifiers to produce higher power by coupling the output energy from a bundle of relatively low-power, fiber amplifiers. It will be appreciated, then, that scaling fiber amplifiers is generally driven by the ability to coherently combine the output of multiple fiber amplifiers. In this regard, to combine the outputs, the individual fiber amplifiers must typically comprise low-noise, single-mode amplifiers that polarize the output energy such that the energy from the individual amplifiers can be efficiently combined into an integrated array.

Although laser systems generate coherent output power in a manner that is intrinsically efficient, a physical limit referred to as the quantum defect limit typically limits the energy conversion process of such systems. As is known, quantum defect is the difference in the photon energy at which the process is pumped versus the energy of the radiated "lasing" photons. For the most efficient systems, 70% to 90% of the pump energy from laser diodes is converted to output energy. For less efficient arrangements, however, the efficiencies can lie in the range of 40% to 50% or lower. Generally, the quantum defect limit, as well as spontaneous radiation losses, miscellaneous optical absorption losses and other non-productive processes, lead to thermal energy release that heats the fiber amplifier. In this regard, nonlinear, optical processes such as Stimulated Raman Scattering (SRS) and Stimulated Brillouin Scattering (SBS) offer greatly reduced quantum defect. Other nonlinear processes that may operate in a fiber amplifier include self-phase modulation, four-wave mixing, photorefractive conversion and thermo-optical effects (also known as Stimulated Thermal Scattering or STS). Typically, SRS processes are more than 95% efficient, while SBS processes can be more than 99% efficient.

In continuous or quasi-steady operational modes, the temperature of the fiber amplifier will rise until an equilibrium heat transfer condition is established. For high power laser systems, such a rise in temperature can result in elevated temperatures in the core of the fiber amplifier (typically where doped lasing media is located in fiber amplifiers having a doped core). In turn, the elevated core temperature can degrade the efficiency of the laser system, lead to unacceptable optical distortions or, in the extreme, to failure of the fiber amplifiers or surrounding system materials and components. Thus, it would be desirable to design a fiber amplifier and optical fiber laser system that conduct heat away from the core of the fiber amplifier or otherwise decreased the amount of heat generated in the fiber core.

In addition to elevated core temperatures, many conventional fiber amplifiers performing nonlinear processes suffer from localized energy conversion and inefficient conversion of laser power. In this regard, in co-propagated nonlinear processes such as SRS where the pump energy is depleted as a Stokes seed signal is amplified, the fiber amplifier has a conversion profile known as a "lazy-S" profile. In this regard, the conversion rate is related to the product of the pump energy and Stokes signal intensities. Therefore, the conversion rate (versus fiber length) is low when the signal or pump intensity is low (e.g., at the start or near the end of the conversion process). In contrast, the conversion rate is typically the highest when the pump energy and Stokes signal intensities are nearly equal.

The conversion rate typically begins slowly, and then rapidly increases until finally it tapers off once the majority of the pump energy has been depleted. More specifically, after beginning slowly, the conversion rate typically rapidly increases at the fiber length position where the Stokes seed has grown to 20–30% of the pump energy. And once the Stokes signal grows to 70–80% of the original pump energy intensity, the conversion rate tapers off. Such a behavior generally concentrates the majority of the energy conversion and thermal load in a localized section of the fiber amplifier.

For counter-propagated nonlinear processes such as SBS, the pump energy depletion and Stokes signal amplification are inherently competitive. Such behavior can lead to temporal fluctuations (referred to as relaxation oscillations) where the Stokes signal output amplitude can vary dramatically. Depletion of the pump energy due to a strong Stokes signal near the input end of the fiber subsequently decreases the pump energy intensity reaching the output end of the fiber. The decrease in pump energy, in turn, decreases the Stokes signal now propagating in an opposite direction in the fiber, toward the input end. As such, frequencies based upon the speed of light in the fiber and the overall fiber length can develop in the Stokes output signal.

Through proper design, such unstable operating regions can possibly be avoided, but designing around such unstable operating regions presents an additional constraint on the system optimization and operational flexibility of the system. Furthermore, the transient conditions on start-up of the system could pass through such regions of instability, presenting unique design issues and control problems. Thus, it would be desirable to design a fiber amplifier and optical fiber laser system that provides distributed amplification of the lasing power and the output of the nonlinear process that more efficiently converts laser power into a high purity, high coherence optical mode. Likewise, such a system and fiber amplifier would reduce the potential for relaxation oscillations and damaging, transient behavior.

SUMMARY OF THE INVENTION

In light of the foregoing background, the present invention provides an improved a fiber amplifier and optical fiber laser system that concurrently generate an intermediate pump energy while depleting that energy through a non-linear conversion process driven by yet another signal wavelength. By generating the intermediate pump energy while depleting that energy, the fiber amplifier and optical fiber laser system of embodiments of the present invention allow a "linear gain" optical conversion process to proceed with less regard to maintaining a low-order, wave-guided, optical mode. By depleting the energy through a non-linear conversion process of high Stokes and quantum efficiencies, the fiber amplifier and optical fiber laser system of embodiments of the present invention can minimize waste heat generated in the fiber amplifier. Such a reduction in waste heat allows the non-linear process to occur in a confined core and, as such, the fiber amplifier of embodiments of the present invention can include a single-mode fiber core. The beneficial use of stimulated non-linear optical processes also overcomes inherent intensity limitations that naturally arise when the spontaneous non-linear processes are allowed to develop and propagate along the fiber.

According to one aspect of the present invention, a fiber amplifier includes at least one longitudinally extending non-doped inner core capable of transmitting signals. At least partially surrounding the inner core and extending at least partially therealong, the fiber amplifier also includes at least one gain region. Advantageously, the gain region is capable of amplifying signals propagating therethrough. The fiber amplifier also includes an outer core surrounding the gain region and the inner core and extending longitudinally therealong. The outer core is capable of transmitting pump energy such that the pump energy at least partially amplifies signals propagating through the inner core according to a nonlinear amplification process, such as a Raman or a Brillouin amplification process. The fiber amplifier can also include a cladding layer surrounding the outer core. In addition, the fiber amplifier can include a photonic gap material surrounding the inner core and disposed between the inner core and the gain region.

According to various embodiments, the inner core comprises a single inner core. In one such embodiment, the gain region comprises a single gain region completely surrounding the inner core, and the gain region is disposed between the inner core and the outer core. In turn, the outer core completely surrounds the gain region. Alternatively, the outer core can completely surround the inner core and be disposed between the inner core and the gain region. In another such embodiment, the gain region comprises a plurality of gain regions that collectively completely surround the inner core. In this embodiment, the gain regions are disposed between the inner core and the outer core, and the outer core completely surrounds the gain regions. Alternatively, the gain regions can comprise a plurality of wedge-shaped gain regions that at extend outwardly from the inner core. In this regard, the outer core can extend between the wedge-shaped gain regions toward the inner core. The gain regions can also be grouped into a plurality of groups of gain regions that are lobed about the inner core.

According to another embodiment, the fiber amplifier has a rectangular cross-sectional shape and defines a lateral axis. In this embodiment, the inner core comprises a plurality of inner cores, and the gain region comprises a plurality of gain regions. The gain regions can therefore be disposed along the lateral axis, and the inner cores can be interspersed between gain regions. In yet another embodiment, the inner core, gain region, outer core and cladding layer have a random cross-sectional shape. In this embodiment, the inner core and the gain region are randomly disposed relative to one another such that the gain region at least partially surrounds the inner core.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 2:
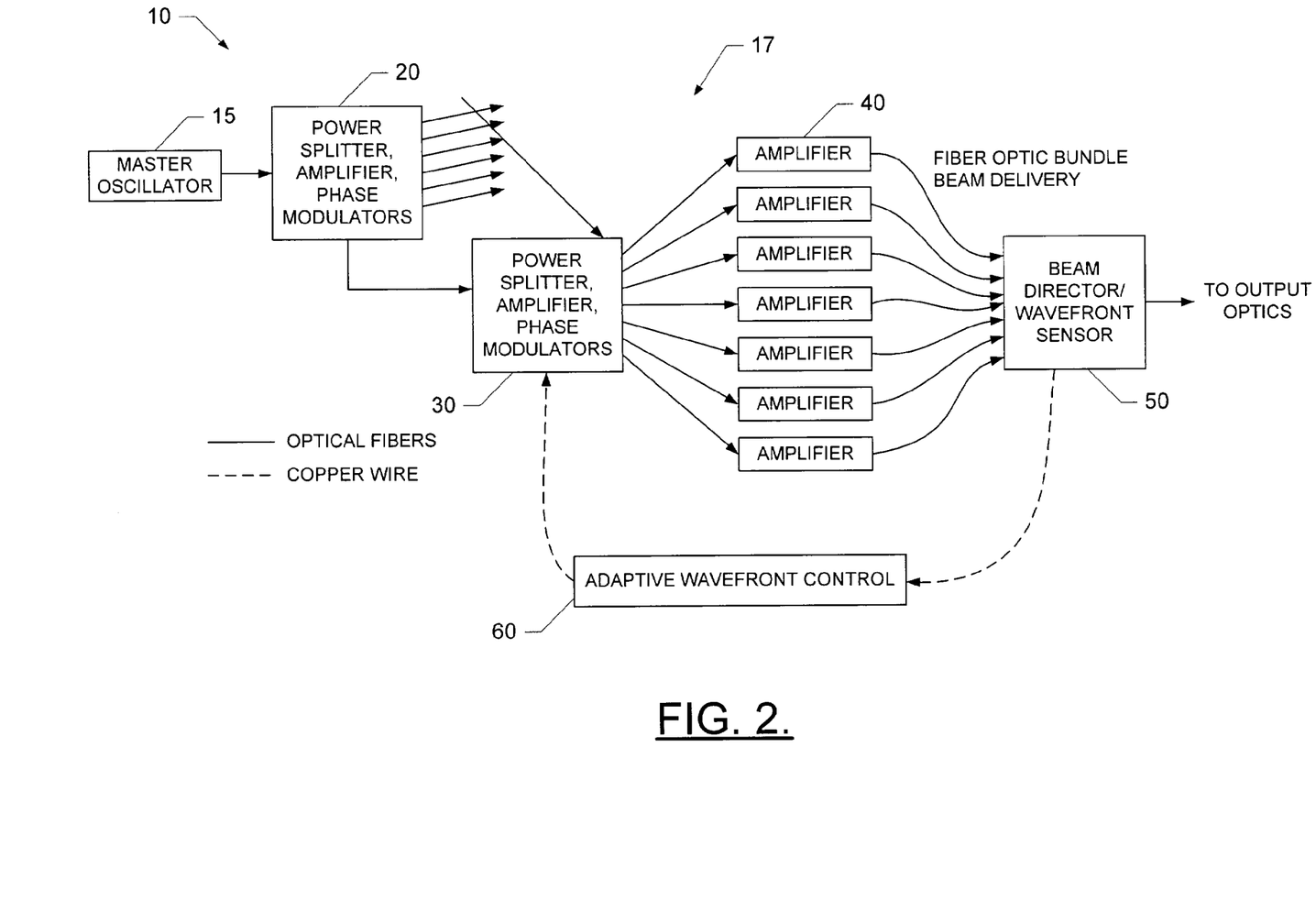
FIG. 2 is a block diagram of selected components of a laser amplifier fabricated using a plurality of fiber amplifiers according to one embodiment of the present invention.

One example of a coherent phased array of fiber optic amplifiers suitable for use in the present invention for generating high-power laser beams needed for long-range radar system applications is shown in FIG. 2. This particular laser power amplifier is described in detail in U.S. Pat. No. 5,694,408, the contents of which are hereby incorporated by reference herein in its entirety. It will be appreciated that the power splitter, amplifier and phase modulator elements in FIG. 2 may be arranged in various configurations other than the exemplary arrangement illustrated in that Figure.

Figure 3A:
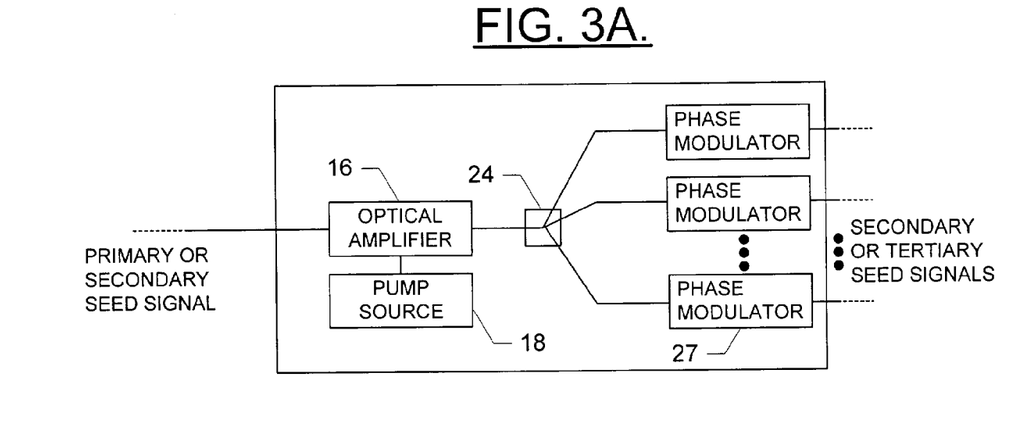
FIGS. 3A, 3B and 3C illustrate alternative configurations of selected fiber amplifiers employed in a high power coherent laser amplifier according to one embodiment of the present invention.

The fiber optic power amplifier 10 illustrated in FIG. 2 includes a master oscillator 15 coupled to a fiber optic power amplifier 17. The master oscillator is a stable, very narrow linewidth, laser, which is operating in a $TEM_{00}$ mode at a frequency within the gain spectrum of the power amplifier and which can be coupled by optical fiber to deliver a continuous wave or pulsed signal to downstream components. The fiber optical power amplifier also includes a first stage composed of a first beam splitter element 20, for splitting a received laser beam into a number N of secondary laser beams. Each of the secondary laser beams is provided to a second beam splitter element 30, which produces a number M of tertiary laser beams from a respective one of the secondary laser beams. Each of the tertiary laser beams is amplified by a respective fiber amplifier generally denoted 40. It will be appreciated that although two separate stages of beam splitter elements 20, 30 and one amplifier stage 40 are depicted in FIG. 2, the fiber optic power amplifier 10 can have more or less amplification stages. For example, when the first and second beam splitter elements 20, 30 include an optical amplifier 16 pumped by a pump source 18, a beam splitter 24 and, optionally, a number N×M phase modulators, respectively, a total of three amplification devices are included in the power amplifier 10, as shown in FIG. 3A.

Figure 3B:
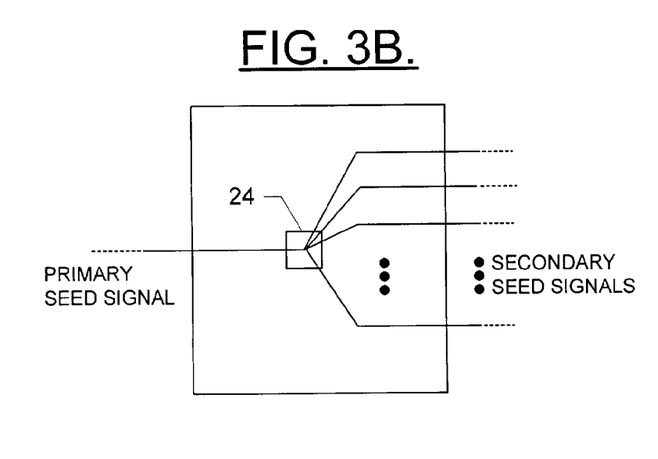
Figure 3C:
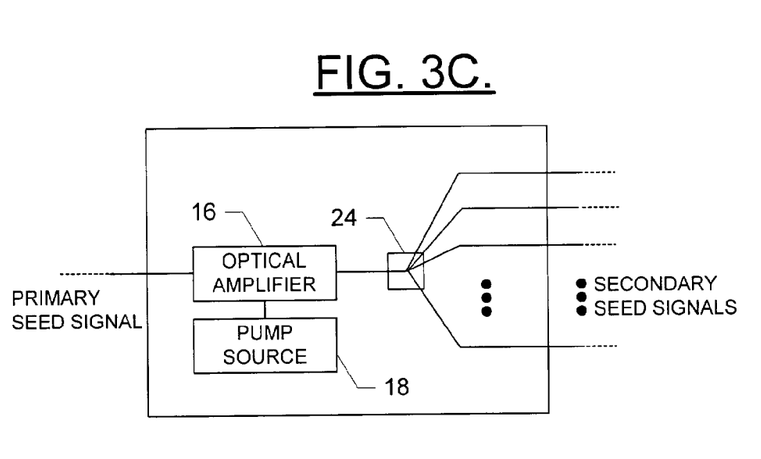

Alternative configurations are also possible. For example, the number of series connected elements, i.e., beamsplitter elements 20, 30, can be any number greater than or equal to 2. Moreover, it should be mentioned that the beam splitter construction is not limited to the arrangement illustrated in FIG. 3A. For example, as shown in FIG. 3B, the first stage element 20 need not include either an amplifier 16 or a phase modulator 27. Alternatively, the first stage element 20 may include optical amplifier 16 but omit phase modulator 27, as shown in FIG. 3C. It will be appreciated, then, that additional amplifier stages can be provided.

It will be noted that the fiber optic power amplifier 10 includes a phase modulator 27 in each optical path terminating at an output device. It will be appreciated that the phase modulators are provided to ensure that all of the N×M laser beams output by power amplifier 10 arrive at the output device, e.g., a lens, with a predetermined phase profile to minimize the losses produced in output device. This may be to either produce a uniform phase across the N×M array of fibers, or as a phase conjugate arrangement of wavefronts across the N×M array so as to correct for the optical distortions elsewhere in the optical system. Such a method of phase conjugate correction may also be used to compensate for external aberrations to an optical system such as atmospheric turbulence or optical errors in any other transmissive, reflective or refractive optical media (e.g., fibers, lenses, mirrors, gratings, windows, etc.). The power amplifier 10 of FIG. 2 includes a waveform sensor 50 in the output optical path, wherein the sensor signals are provided to phase modulators 27 in elements 20, 30 via an adaptive waveform controller 60. Examples of the construction and operation of waveform sensor 50 and waveform controller 60 are provided in above-referenced U.S. Pat. No. 5,694,408.

Figure 4:
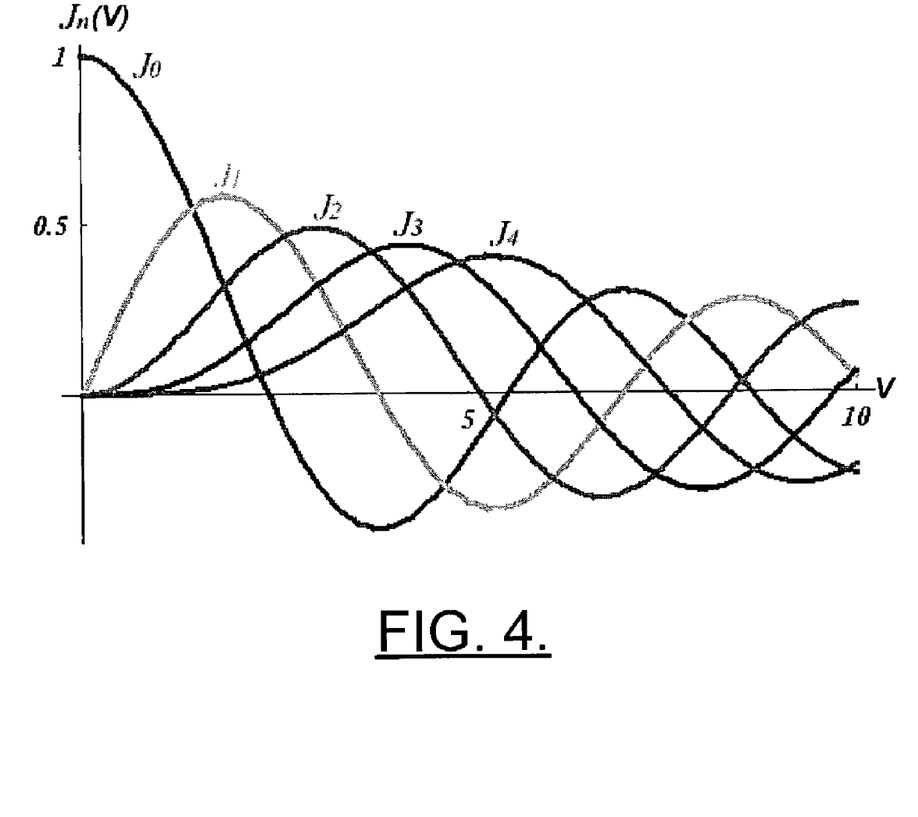
FIG. 4 is a graph illustrating various Bessel functions describing modes of fiber amplifiers as a function of the V-number of the fibers.
Figure 5:
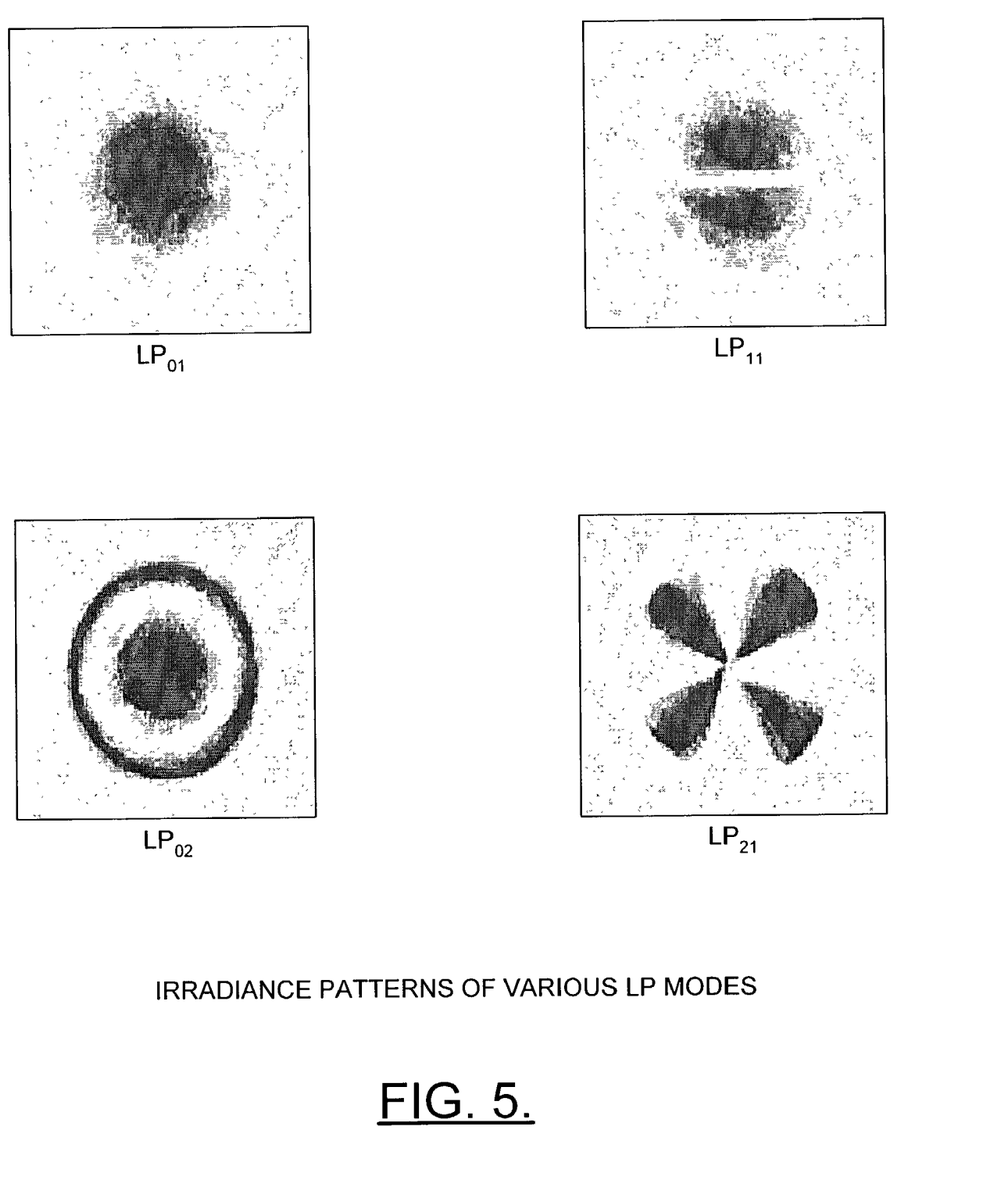
FIG. 5 illustrates irradiance patterns of several linearly polarized (LP) modes of fiber amplifiers.

As will be appreciated by those skilled in the art, the modes in a fiber amplifier are typically mathematically described by Bessel functions, as shown in FIG. 4. For example, as shown, the fundamental mode $J_0$ has peak intensity on the central axis with side lobes of decaying amplitude spreading out radially. As will also be appreciated by those skilled in the art, the modes of fiber amplifiers are often denoted as linear polarized modes $LP_{nm}$, where n represents the order of the Bessel function (i.e., the number of radial nodes that occur in the electric field distribution of the mode) and m represents the number of zero crossings (i.e., the number of azimuthal, or angular, nodes that occur). In this regard, the LP mode can be identified by a pattern in the output of the fiber as the output illuminates a screen, as shown in FIG. 5. As shown, higher order modes generally have azimuthal degeneracy that leads to more complex intensity patterns and potentially more complex phase maps. It can be assumed that the zero field at the outer edge of the field distribution is counted as a node and, thus, $n \geq 1$. In turn, $m \geq 0$ for the azimuthal nodes.

Figure 6:
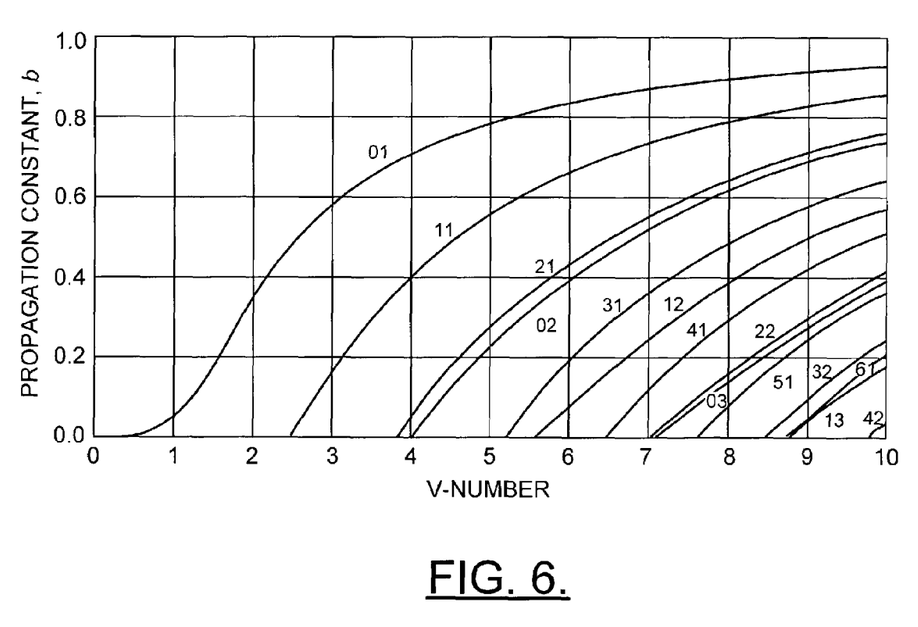
FIG. 6 is a graph illustrating the propagation constant as a function of the V-number of fiber amplifiers for several modes of propagating signals.

The relation of the mode size to the core index structure determines the operating modes. For example, the $LP_{01}$ mode is the common "Gaussian" mode shape having a single lobe. The $LP_{02}$ mode, however, has an additional "donut" ring around the central lobe. As is known to those skilled in the art, a parameter known as the characteristic waveguide parameter or the normalized wavenumber, or simply the V-number of the fiber, can be used to determine which modes of signals will be supported by the fiber. Determining the number of modes that can propagate in a particular fiber can be determined in any one of a number of manners, such as by plotting the propagation constants, b, of the fiber modes as a function of the V-number of the fiber, as shown in FIG. 6. As shown, both the $LP_{01}$ and $LP_{02}$ modes can operate if the core is large enough, but the $LP_{02}$ mode is discriminated when the V-number is approximately 4.0. In this regard, as between the $LP_{01}$ and $LP_{02}$ modes, only the $LP_{01}$ mode will operate when the V-number is below approximately 4.0 without high losses.

For single mode operation, the inner core of the fiber amplifier is sized so as to allow only the $J_0$ mode to operate without the unacceptable level of refractive losses that occur outside the first lobe of the mode (as shown in FIG. 4). Other, higher-order modes, i.e., $J_1$, $J_2$, etc., have the first lobe structure in a ring surrounding the central axis and the peak intensity is displaced at a distance from the fiber axis where the V-number equals 0.0 (with the intensity on-axis being null). A single-mode fiber design is sized with a stepped or graded index inner core that guides the fundamental mode, $J_0$, and rejects all the higher-order modes. Thus, the single mode limit where the V-number equals 2.405 restricts the inner core diameter to approximately 4 to 10 microns, depending upon the index step, as such is known.

In order to propagate higher powers down the fiber and prevent spontaneous, nonlinear conversion effects, however, the core diameters are preferably sized such that the optical intensities are below the SBS or SRS thresholds, as such are known. Typically, this drives the inner core diameter to sizes exceeding 30 microns, where the V-number is greater than 6.0 or 10.0. As seen in FIG. 6, sizing the inner core as such allows between 6 and 15 $LP_{nm}$ modes to operate in the fiber amplifier. Therefore, the optical limits of a fiber amplifier force the fiber amplifier to be designed to either effectively control a single mode in a large core, or otherwise produce a laser output with a high coherence.

Designing a large-core fiber amplifier operating in many modes is a practical approach to producing high powers if an alternate process exists to convert the laser power into a single, coherent optical mode. The use of a nonlinear conversion process such as Raman scattering, is such a process. Thus, referring now to FIGS. 7A and 7B, according to the present invention, a fiber amplifier 60 includes at least one inner core 62 that is undoped, yet susceptible to a nonlinear process such as SBS or SRS. In this regard, the inner core is designed to support the propagation and amplification of Stokes seed signals in multiple modes and are therefore also known as a multi-mode signal core. The inner core can be made from any number of known materials but, in one embodiment, the inner core comprises undoped germanosilicate glass. The inner core can comprise a single inner core sized to support signals in multiple modes, or the inner core can comprise a plurality of inner cores each sized to support signals in a single mode or signals in multiple modes. Although the inner core may be described herein as comprising a single inner core, it should be understood that the inner core can comprise one or more inner cores without departing from the spirit and scope of the present invention.

Figure 7A:
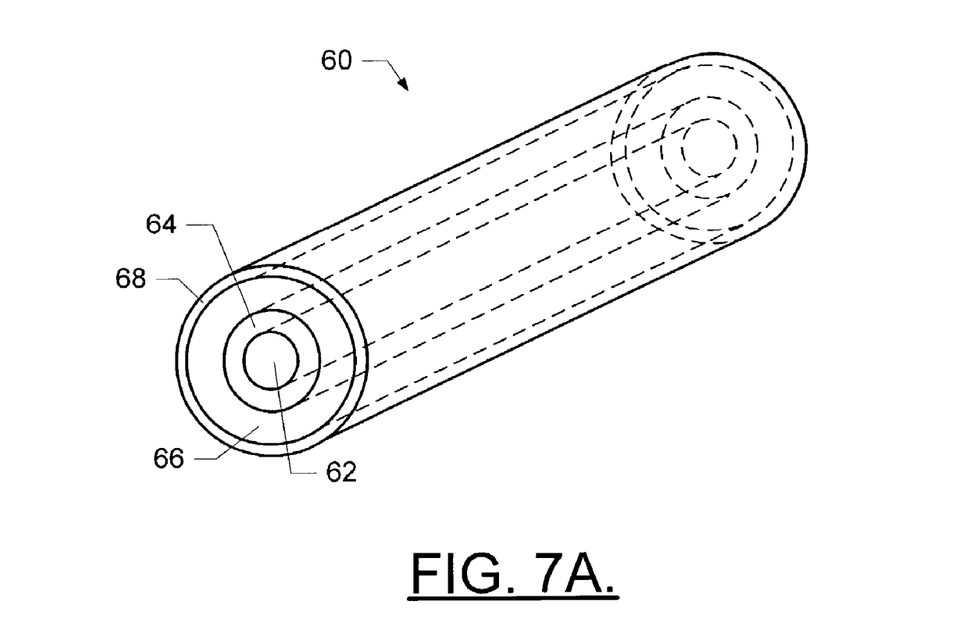
FIGS. 7A and 7B are an orthographic view and a front view, respectively, of a fiber amplifier according to one embodiment of the present invention.
Figure 7B:
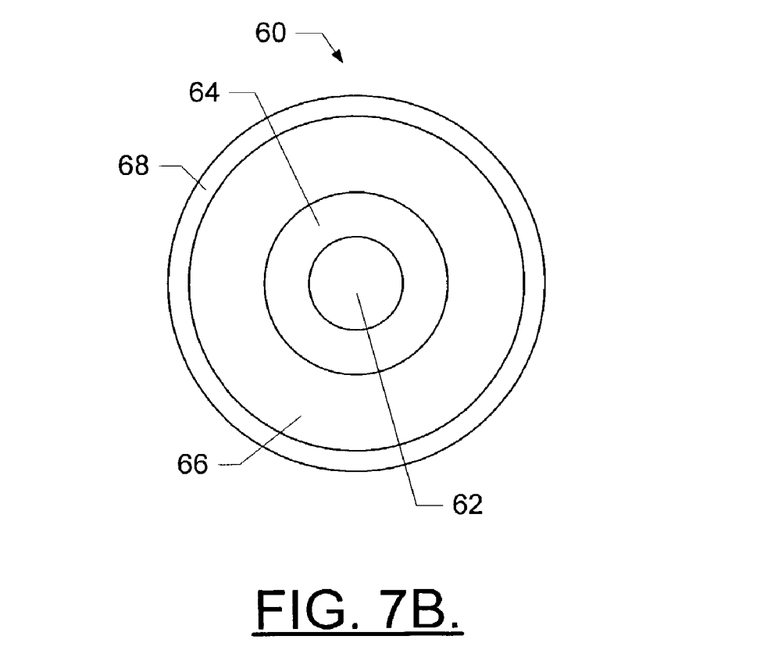

At least partially surrounding the undoped inner core, the fiber amplifier 60 includes at least one gain region 64 that will support other higher order laser modes. In this regard, the gain region is preferably doped with one or more rare earth elements. For example, the gain region can comprise silica glass doped with rare earth elements such as, for example, ytterbium, neodymium, praseodymium, erbium, holmium or thulium. The gain region is preferably designed to have a lower refractive index $N_g$ than the refractive index of the inner core $N_c$ in order to confine the signals within the inner core. Similar to the inner core 62, the gain region may be described herein as comprising a single gain region, however, it should be understood that the gain region can comprise one or more gain regions.

Surrounding the gain region 64 and the inner core 62, the fiber amplifier 60 includes an outer core 66. The outer core generally supports the propagation of multiple modes of pump signals and is therefore also known as a multi-mode pump core. Like the gain region 64, the outer core is preferably designed to have a lower refractive index $N_p$ than the refractive index of the inner core $N_c$ in order to confine the signals within the inner core. The fiber amplifier also includes a cladding layer 68 that surrounds the outer core. While the cladding layer can be formed of various materials, the cladding layer is typically formed of a material, such as a polymer (UVF-376, a low-index, fluorinated polymer), that has a refractive index $N_{cl}$ that is lower than the refractive index of the outer core $N_p$.

Figure 8A:
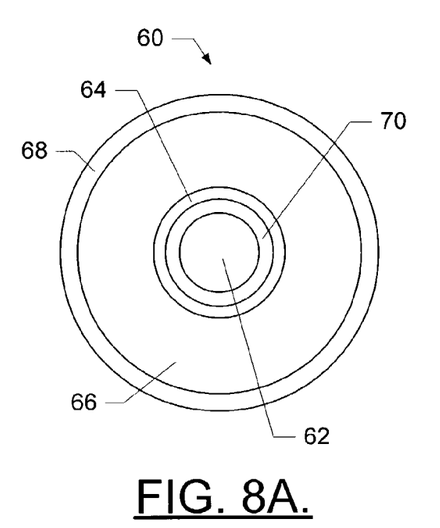
FIGS. 8A–8E, 9A–9D and 10 are front views of alternative embodiments of a fiber amplifier according to the present invention.
Figure 8B:
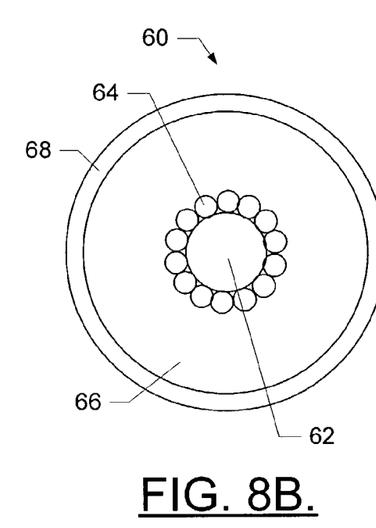

The fiber amplifier 60 can include any number of gain regions 64 at least partially surrounding the inner core 62 in any one of a number of different manners. In this regard, the gain region can comprise completely surround the inner core and comprise a single annulus of rare-earth doped material surrounding the inner core, as shown in FIGS. 7A and 7B. The fiber amplifier can also include at least one photonic gap 70 disposed between the inner core and the gain region, as shown in FIG. 8A. The photonic band gaps have a refractive index that varies largely with the other elements of the fiber amplifier and, as such, can strongly influence the waveguiding properties of the fiber amplifier, as described below. Each photonic band gap can be formed in the fiber amplifier according to any of a number of known methods, including doping selected regions of the fiber or by creating a "hole" in the fiber structure, where the hole can comprise a pore in the fiber material that has a vacuum or gasses disposed therein. Alternatively, the photonic band gaps can comprise materials such as glass, ceramic, crystal and/or other material having a refractive index different from the surrounding or fiber core materials. As shown in FIG. 8B, in another embodiment, the gain region can comprise a plurality of smaller gain regions collectively surrounding the inner core in an annular manner.

In embodiments including the photonic band gaps 70, photonic band gaps in fibers are generally characterized as dielectric structures that guide electromagnetic waves or photons. These photonic band gaps can have a refractive index smaller than the other elements of the fiber amplifier 60. For example, presume a fiber amplifier including photonic band gaps comprising holes filled with a vacuum or gases having a refractive index approaching unity, and presume the fiber material comprises silica having a refractive index of approximately 1.5. By placing the band gaps near the non-linear inner core 62, the band gaps can control the longitudinal optical mode of the inner core, and can control the polarization state of the non-linear optical mode.

Figure 8C:
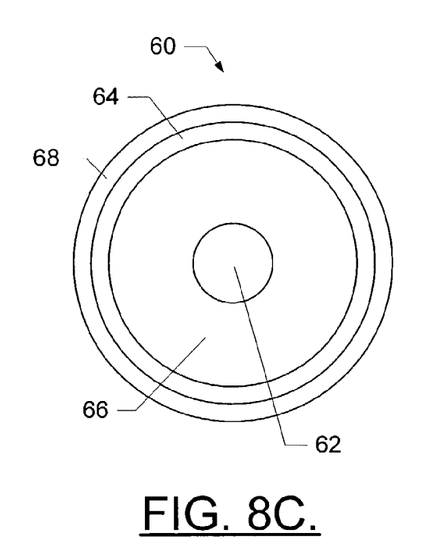
Figure 8D:
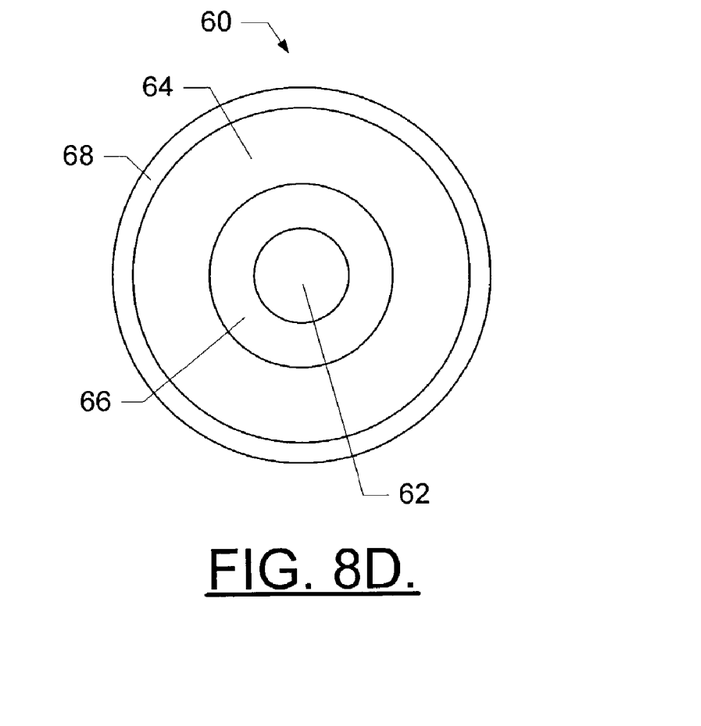
Figure 8E:
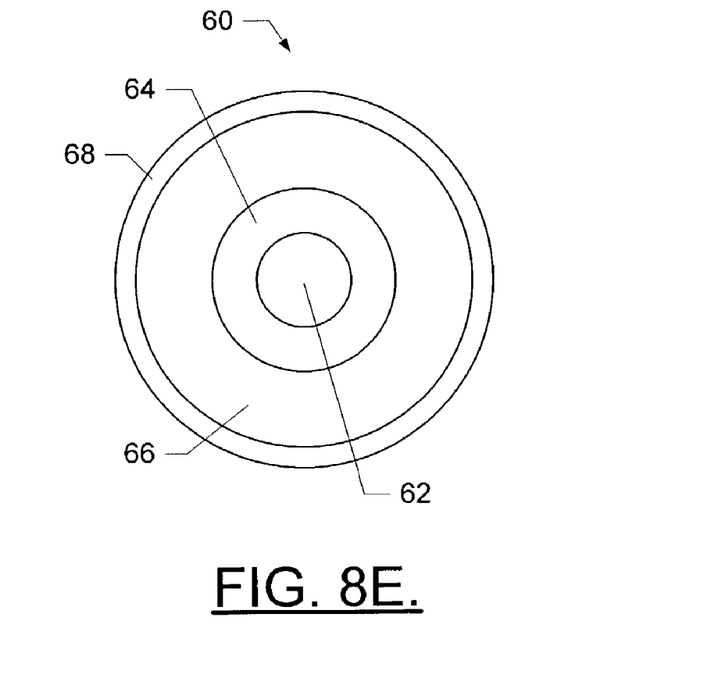

Alternatively, the gain region 64 can be disposed such that the outer core 66 is disposed between the gain region and the inner core 62. In such embodiments, the gain region can be sized such that the gain region has a cross-sectional area the same size as the outer core, a cross-sectional area smaller than the outer core (FIG. 8C) or a cross-sectional area larger than the outer core (FIG. 8D). In another embodiment, the gain region comprises a plurality of wedge-shaped regions extending outwardly from and distributed annularly around the inner core, as shown in FIG. 8E. As shown, the outer core surrounds the wedge-shaped gain regions and extends between the gain regions toward the inner core.

Figure 9A:
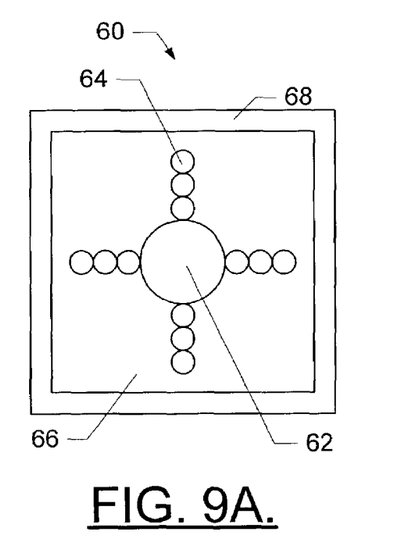
Figure 9B:
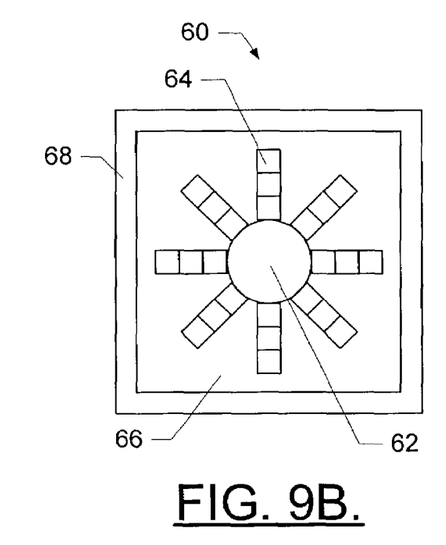

As shown in FIGS. 7–8, the fiber amplifier 60 generally has a circular cross-sectional shape with the gain region 64 concentrically disposed about the inner core 62. It will be appreciated, however, that the fiber amplifier can have other shapes and can include one or more gain regions non-concentrically disposed about one or more inner cores. In this regard, reference is now drawn to FIGS. 9A–9E. As shown in FIGS. 9A and 9B, the fiber amplifier can have a square cross-sectional shape and include a plurality of groups of gain regions that are lobed about the inner core. At this point it will be noted that the gain regions and inner cores can have a number of different cross-sectional shapes such as, for example circular and square, as shown in FIGS. 9A–9E.

Figure 9C:
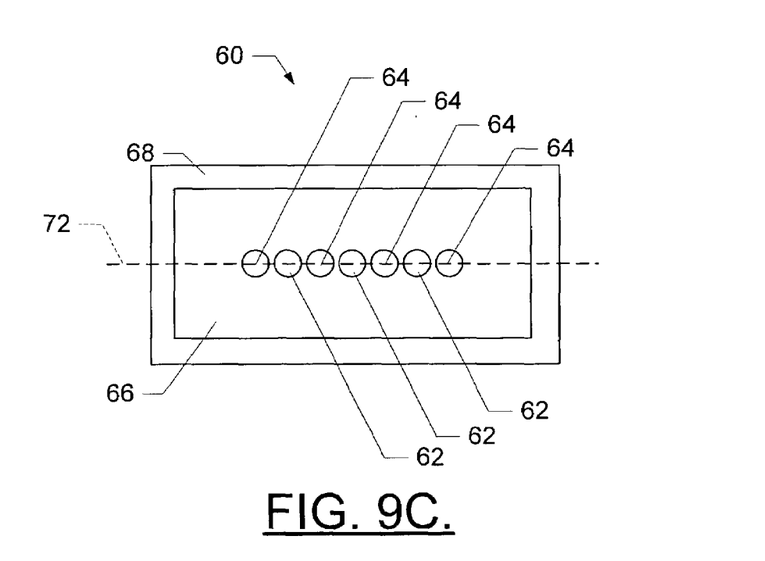
Figure 9D:
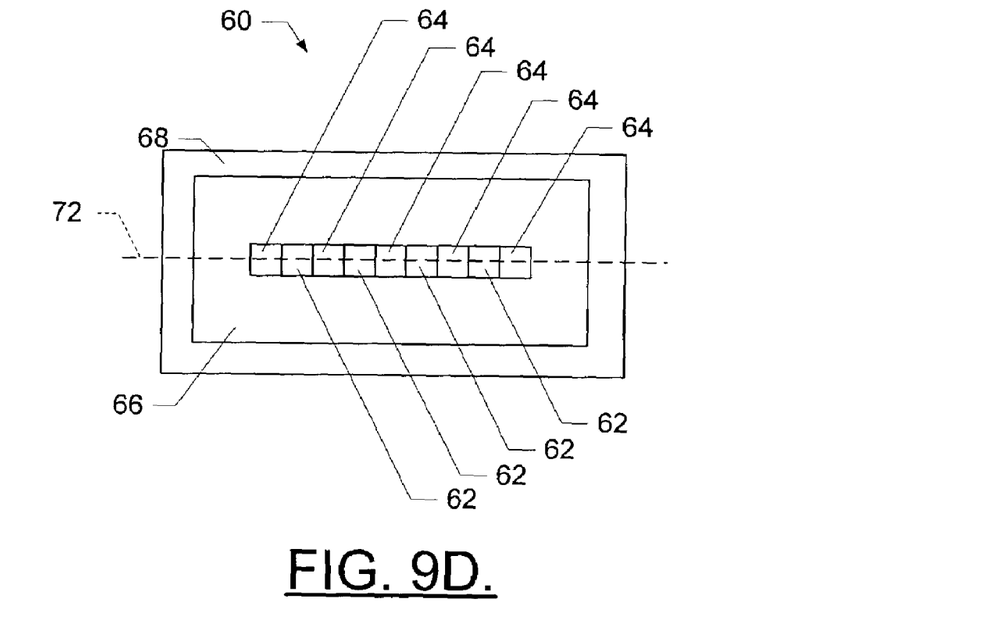

The fiber amplifier 60 can alternatively have a rectangular cross-sectional shape and include a plurality of inner cores 62, as well as a plurality of gain regions 64, where the inner cores and gain regions are surrounded by the outer core 66, as shown in FIGS. 9C and 9D. As illustrated in FIGS. 9C and 9D, the fiber amplifier can include a plurality of inner cores and a plurality of gain regions. The inner cores and gain regions can be disposed along a lateral axis 72 of the cross-section of the fiber amplifier, with the inner cores interspersed between gain regions. The gain regions can be spaced apart from the respective inner cores, as shown in FIG. 9C, or the gain regions can be disposed immediately adjacent the respective inner cores, as shown in FIG. 9D.

Figure 10:
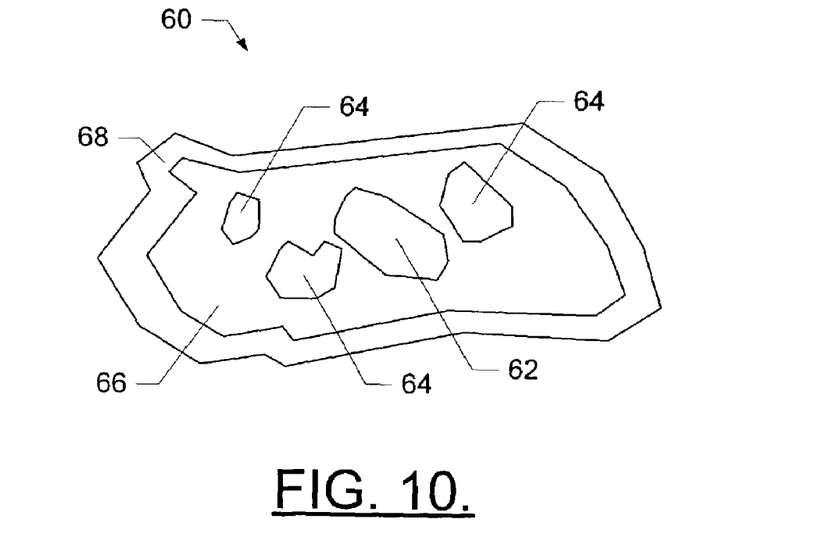

As illustrated by FIGS. 8 and 9, the fiber amplifier 60 can have any of a number of shapes, and the inner core 62 and gain region 64 can be disposed in any of a number of different manners relative to one another and have any of a number of different shapes. Thus, it will be appreciated that the fiber amplifier, as well as the gain region, inner core, outer core 66 and cladding layer 68, can have a random cross-sectional shape, as shown in FIG. 10. As also shown in FIG. 10, the gain region and the inner core can be randomly disposed within the fiber amplifier and be randomly disposed relative to one another.

The shape of gain region 64, inner core 62, outer core 66 and cladding layer 68 for all of the illustrated embodiments thus can be designed through an analysis of the propagation of the various optical fiber modes, generation and dissipation of the residual heat from Stokes and quantum inefficiencies, and the overlap, absorption, and energy transfer between the various optical modes. In this regard, the various illustrated embodiments differ from one another in the manner of overlap and interaction of the optical modes and the distribution of heat dissipation due to the inefficiencies of each process. The doped gain regions are disposed sufficiently close to the inner core so that optical energy is coupled from the laser gain power in the gain regions to the Stokes signal in the inner core. In addition, the desire is to spread out the more inefficient lasing process that occurs in the doped gain regions so as to provide better dissipation of the waste heat.

As an example, the fiber amplifier 60 could include an 8-micron inner core 62 comprising germano-silicate, surrounded by a 30-micron gain region 64 comprising rare-earth doped silica glass. The inner core and gain region could then be further enclosed by a 300-micron outer core 66, which can be enclosed by a protective cladding layer 68. Such a fiber geometry is shown schematically in FIGS. 7A and 7B. And whereas the fiber can have any of a number of different lengths, the fiber amplifier can have a length on the order of tens of meters to hundreds of meters.

The outer core 66 could be adapted to accept and guide electromagnetic energy at wavelengths suitable to excite the rare-earth ions doped in the neighboring layer. The rare-earth ions would then spontaneously emit photons that could be guided along the doped gain region 64. Subsequently, these photons can oscillate between external reflectors or between internal Bragg reflectors so as to be amplified by stimulated emission of other excited, rare-earth ions in the layer. The stimulated emission forms a laser process and can produce high intensity optical modes in both the doped gain region and in the higher index, inner core 62 that is overlapped by the lasing modes. Alternatively, an external source of photons at the proper wavelength can be introduced into the fiber amplifier 60 so that the external lasing signal is amplified to high intensity. The high-intensity lasing mode can then be Stokes-shifted in the inner core through a second stimulated emission process such as SBS or SRS. A signal introduced into the fiber amplifier at the proper Stokes-shifted wavelength is then amplified along the inner core.

In addition to sizing the inner core 62 to support propagation and amplification of signals in multiple modes, the inner core, as well as the gain region 64, can be sized based upon control of the mode of the Stokes signal and the nonlinear thresholds for secondary Stokes conversion. Properly designed, such limits can be avoided if the maximum Stokes intensity and bandwidth characteristics are properly set for the exit end of the fiber amplifier 60. In this regard, the relative intensities of the Stokes signal and Stokes pump energy (resulting from the ion-lasing process) must be such that the stimulated conversion process dominates over any spontaneous, non-linear conversion process. Since less attention is paid to the optical modes of the amplified laser power, the size and shape of the doped gain region need not be small to preserve the discrimination for a single, longitudinal optical mode. Furthermore, the inner core are preferably sized and shaped to guide only low-order optical modes. Minor, spontaneous conversion to a second or higher Stokes order is tolerable as long as the purity of the primary mode adequately propagates and is coherent enough to be properly combined with the outputs of other fiber amplifiers to produce the overall system power levels and beam quality desired.

In operation, a pump signal from a high power pulsed or CW laser, presumed to be multimode, is focused onto the region of the fiber amplifier 60 comprising the inner core 62, gain region 64 and outer core 66. It will be appreciated that the pump laser can comprise any of a number of different lasers. For example, the pump laser can comprise one or more semiconductor lasers and laser arrays; solid state laser devices; gas lasers, both discharge and microwave pumped; chemical lasers; and excimer lasers. The optical pumping light could also be continuous or pulsed. The focused pump energy is decomposed into modes for the fiber amplifier at the pump wavelength and, after a short distance, the pump energy is randomly distributed in phase and amplitude so as to produce an approximately uniform intensity distribution over the region into which the pump signal is focused. In this regard, the pump energy produces a Raman gain at every point that is also uniformly distributed and a function of the Raman gain coefficient, the pump beam intensity, the Stokes seed signal intensity, and the cross-sectional area of the outer core. The induced gain amplifies a Stokes seed signal injected into the inner core at the desired Raman shifted wavelength. It is a property of the Raman process that the gain occurs at a photon energy reduced by a fixed amount from the energy of the pump photon, regardless of the pump photon energy. For germano-silicate fiber cores commonly used in telecommunications, the gain reaches a peak value for an energy shift of about 430–460 $cm^{-1}$, though this value can be widely adjusted through composition.

The increase in power per unit length in the inner core 62 of the fiber amplifier 60 is accompanied by a reduction of the pump power per unit length. In this regard, the reduction of pump power is generally a function of the Raman gain coefficient, the pump beam power, the Stokes signal power, the cross sectional area of the outer core, as well as the wavelengths of the pump and Stokes signals respectively. In a typical Raman architecture, the rate of conversion from the pump to the Stokes wavelengths goes through a localized, rapid gradient near the center of the length of the fiber. This is because the Raman gain is dependent upon both the pump beam power and the Stokes signal power. The pump depletion and Stokes amplification start slowly (due to the low Stokes intensity). Then, the process goes through a rapid transfer (where the pump energy is rapidly depleted as the Stokes signal sees a rapid amplification). Finally, the conversion rate tapers off slowly to maximum efficiency (where the pump intensity is already depleted to low levels).

Advantageously, in the fiber amplifier 60 of the present invention, the power of the pump beam is concurrently amplified by the doped gain region 64 and depleted by the Stokes conversion process. Therefore, the wavelength conversion process is more evenly distributed along the length of the fiber amplifier. The efficiency can be further enhanced if the pump beam at each end of the fiber is reflected back into the fiber, while the amplified Stokes signal is extracted and propagated to the output optics of the system. This effectively operates the pump laser process in a more efficient oscillating resonator condition for better power extraction from the doped gain region.

Whereas the power loss to the pump modes causes attenuation of the pump power distribution, the distribution of power across the pump modes can remain approximately constant. Hence, the Stokes signal power can grow at the expense of the pump power so that essentially complete conversion takes place within the fiber amplifier 60. If a sufficient parasitic spontaneous Raman signal develops in the outer core, it too can be amplified and compete with the Stokes signal for the pump power. The Stokes signal wavelength power of energy in the cladding layer 68 grows as a function of the Raman gain coefficient, the pump beam power, the power of energy in the cladding at the Stokes signal wavelength and the cross sectional area of the outer core. In this regard, the Stokes signal wavelength power of energy in the cladding layer is preferably quenched by high signal power in the inner core or otherwise suppressed.

The power in the inner core 62 can readily generate additional Raman down shifted signals in the inner core, so that process must also be controlled by design or by remedial measures. Properly tailored designs do not lead to the spontaneous, nonlinear processes since the power of the pump beam is continuously depleted by the preferred, nonlinear conversion process, and because the spontaneous, nonlinear behavior is dominated by the power of the Stokes signal. In this regard, the design is preferably selected based upon consideration of the input pump and Stokes seed intensities, the doped gain region 64 properties (e.g., size, position, ion concentration, etc.), the material properties of the inner core, and the length of the fiber. Known secondary conversion processes can also be avoided, such as by restricting the length of the fiber amplifier to between a few tens of meters to several kilometers depending upon the optical intensities and optical overlap of the various optical modes.

As previously stated, the inner core 62 of the fiber amplifier 60 is preferably designed to support the propagation and amplification of signals in multiple modes. Thus, efficient conversion of the pump wavelength can also occur through the Stimulated Raman Scattering (SRS) process. In fact, if a signal at the Raman shifted wavelength is launched into the multimode inner core in substantially its lowest order mode, the signal will be amplified. Indeed, the tendency in a long fiber amplifier will be for the lowest order mode to grow at the expense of any higher order modes that were also inadvertently launched. One special case of interest is that for which the inner core is the same size as the cladding layer 68. If the signal at the Raman shifted wavelength is launched as the relatively clean fundamental mode of the clad/signal waveguide, it will be maintained as a single mode and even further improved in beam quality as it propagates down the fiber and saturates the Raman gain. Thus, a principal advantage of the present invention is that the pump energy can be multimode for highly efficient coupling into the cladding layer, with the resulting laser energy also being multimode and capable of being coupled into the inner core. Also, the pump energy can be converted to a high brightness output beam at the Stokes-shifted wavelength. In addition, the wavefront variations and aberrations of the pump power and doped-gain laser are not directly transferred to the wavefront phase of the amplified seed beam.

It is expected that, during operation, residual heat will be generated in the fiber amplifier 60. Advantageously, the majority of the residual heat in the fiber amplifier is generated in the doped region 64 due to the larger "quantum-deficit" associated with lasing as opposed to the relatively efficient nonlinear, Stokes-shifting processes. In this regard, it will be appreciated that lasing, which occurs in the doped gain region, is the least efficient optical process occurring within the fiber amplifier. As the gain region is preferably distributed around the inner core 62 of the fiber, the least efficient process is distributed into a region of the fiber with a larger periphery. This provides lower thermal impedance to efficiently conduct the residual heat away from the inner core.

Also, the nonlinear process within the fiber amplifier 60 is primarily driven by the optical energy density in the fiber amplifier material, which is generally a function of the pump wavelength, the power of the pump beam and Stokes signal, the lasing bandwidth and the composition of the material. For SRS in a fiber amplifier constructed of germano-silicate, for example, the primary structure of the SRS process is a spectral shift to the red of about 430–460 $cm^{-1}$. For a 1-micron laser pump beam, then, such a shift corresponds to a frequency shift of about 12–13 Terahertz. As such, the Stokes spectrum can allow increased optical bandwidth of the pump laser line of up to 5–6 Terahertz. This permits optical pumping and lasing arrangements having short coherence lengths or multiple, uncorrelated optical wavelengths. This effect can allow high optical powers to be transmitted through the fiber yet avoid undesired spontaneous, non-linear optical conversion since those processes are dependent on the spectral bandwidth of the pump wavelengths.

It will be appreciated, then, that in the preferred seeded Stokes-shifting process, the SRS output can remain considerably more narrowband. In this regard, the addition of other material into a fiber amplifier comprising silica glass, such as $GeO_2$, $P_2O_5$ or $B_2O_3$ (the so-called germano-, phospho- or boro-silicate glasses) can influence the Raman gain spectrum. This can either enhance the Raman gain (as in the germano-silicate composition) or increase the Stokes frequency shift (as seen for boro- and phospho-silicates).

Thus, the addition of other material into the fiber amplifier composition can be valuable as a certain spectral band is desired for low absorption propagation through an atmosphere containing absorbing species such as water vapor or carbon dioxide. If even more spectral shift is desired, the use of a multiple Stokes-shift design can be invoked, as is known. Typically, a multiple-Stokes design would be operated with appropriately tuned, multiple seed beams and longer fibers to allow the energy conversion process to cascade through several Stokes shifts. The typical outcome of such a process, however, is to get successively reduced efficiency and increased optical bandwidth for each order of shift.

It will also be appreciated that although the foregoing has been described utilizing the fiber amplifier of the present invention in a Raman process, the fiber amplifier can be utilized in any one of a number of nonlinear processes without departing from the spirit and scope of the present invention. In this regard, processes such as Brillouin and photo-refractive processes have different spectral characteristics (e.g., Brillouin has much smaller Stokes shifts and narrower bandwidth properties), but such processes work on the same general principles as the Raman process. As such, the nonlinear process to be used can be selected based upon the desired application. For some fiber amplifier dopants (e.g., Ytterbium—Yb), the emission spectrum is relatively broad. Therefore, the SRS process may be desirable because of the probability of Stokes shifting out of the $Yb^{+++}$ gain spectrum and, thus, avoiding any gain coupling back to the pump laser spectrum. Conversely, it could be desirable to take advantage of the overlap of the doped-gain spectrum and the Stokes-shifted spectrum to further amplify the Stokes signal (relying on the guiding features of the core region to control the Stokes mode structure). In this regard, the non-linear optical conversion process may benefit from concurrent amplification of the Stokes-shifted frequency by the excited, rare earth ions, as long as the optical phase and spectral purity of the seed signal is maintained. Interference of the optical phase with a spectrally overlapped lasing mode can deteriorate the optical phase control of the stimulated non-linear process. Alternate arrangements using some of the direct diode laser energy to assist in the Stokes process could also be attained if the diode laser wavelengths are closely tuned to the pump laser and Stokes wavelengths.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A fiber amplifier comprising:
    at least one longitudinally extending non-doped inner core capable of transmitting signals;
    at least one gain region at least partially surrounding said inner core and extending at least partially longitudinally therealong, wherein said at least one gain region includes a dopant such that said at least one gain region is capable of amplifying signals propagating therethrough; and
    an outer core surrounding said at least one gain region and said inner core and extending longitudinally thereal­ong, wherein said outer core is capable of transmitting pump energy such that the pump energy at least partially amplifies signals propagating through said inner core according to a nonlinear amplification process.

2. A fiber amplifier according to claim 1 further comprising a cladding layer surrounding said outer core.

3. A fiber amplifier according to claim 1, wherein said outer core is capable of transmitting pump energy such that the pump energy at least partially amplifies signals according to a Raman amplification process.

4. A fiber amplifier according to claim 1, wherein said outer core is capable of transmitting pump energy such that the pump energy at least partially amplifies signals according to a Brillouin amplification process.

5. A fiber amplifier according to claim 1 further comprising a photonic gap material surrounding said at least one inner core and disposed between said at least one inner core and said at least one gain region.

6. A fiber amplifier according to claim 1, wherein said at least one inner core comprises a single inner core, wherein said at least one gain region comprises a single gain region completely surrounding said inner core, wherein said gain region is disposed between said inner core and said outer core, and wherein said outer core completely surrounds said gain region.

7. A fiber amplifier according to claim 1, wherein said at least one inner core comprises a single inner core, wherein said at least one gain region comprises a plurality of gain regions that collectively completely surround said inner core, wherein said gain regions are disposed between said inner core and said outer core, and wherein said outer core completely surrounds said gain regions.

8. A fiber amplifier according to claim 1, wherein said at least one inner core comprises a single inner core, wherein said at least one gain region comprises a single gain region, wherein said outer core completely surrounds said inner core and is disposed between said inner core and said gain region, and wherein said gain region completely surrounds said outer core.

9. A fiber amplifier according to claim 1, wherein said at least one inner core comprises a single inner core, wherein said at least one gain region comprises a plurality of wedge-shaped gain regions that at extend outwardly from said inner core, and wherein said outer core extends between said wedge-shaped gain regions toward said inner core.

10. A fiber amplifier according to claim 1, wherein said at least one inner core comprises a single inner core, wherein said at least one gain region comprises a plurality of gain regions grouped into a plurality of groups, and wherein the groups of gain regions are lobed about said inner core.

11. A fiber amplifier according to claim 1, wherein said fiber amplifier has a rectangular cross-sectional shape and defines a lateral axis, wherein said at least one inner core comprises a plurality of inner cores, wherein said at least one gain region comprises a plurality of gain regions, wherein said gain regions are disposed along the lateral axis, and wherein said inner cores are interspersed between gain regions.

12. A fiber amplifier according to claim 1, wherein said at least one inner core, said at least one gain region, said outer core and said cladding layer have a random cross-sectional shape, and wherein said at least one inner core and said at least one gain region are randomly disposed relative to one another such that said at least one gain region at least partially surrounds said inner core.

13. A fiber amplifier comprising:
    at least one longitudinally extending non-doped inner core; and
    at least one gain region at least partially surrounding said inner core and extending at least partially longitudinally therealong, wherein said at least one gain region includes a dopant.

14. A fiber amplifier according to claim 13 further comprising:
    an outer core surrounding said at least one gain region and said inner core and extending longitudinally thereal­ong; and
    a cladding layer surrounding said outer core.

15. A fiber amplifier according to claim 14, wherein said at least one inner core comprises a single inner core, wherein said at least one gain region comprises a single gain region completely surrounding said inner core, wherein said gain region is disposed between said inner core and said outer core, and wherein said outer core completely surrounds said gain region.

16. A fiber amplifier according to claim 14, wherein said at least one inner core comprises a single inner core, wherein said at least one gain region comprises a plurality of gain regions that collectively completely surround said inner core, wherein said gain regions are disposed between said inner core and said outer core, and wherein said outer core completely surrounds said gain regions.

17. A fiber amplifier according to claim 14, wherein said at least one inner core comprises a single inner core, wherein said at least one gain region comprises a single gain region, wherein said outer core completely surrounds said inner core and is disposed between said inner core and said gain region, and wherein said gain region completely surrounds said outer core.

18. A fiber amplifier according to claim 14, wherein said gain region has a cross-sectional area no greater than a cross-sectional area of said outer core.

19. A fiber amplifier according to claim 14, wherein said gain region has a cross-sectional area no smaller than a cross-sectional area of said outer core.

20. A fiber amplifier according to claim 14, wherein said at least one inner core comprises a single inner core, wherein said at least one gain region comprises a plurality of wedge-shaped gain regions that at extend outwardly from said inner core, and wherein said outer core extends between said wedge-shaped gain regions toward said inner core.

21. A fiber amplifier according to claim 14, wherein said at least one inner core, said at least one gain region, said outer core and said cladding layer have a random cross-sectional shape, and wherein said at least one inner core and said at least one gain region are randomly disposed relative to one another such that said at least one gain region at least partially surrounds said inner core.

22. A fiber amplifier according to claim 13, wherein said at least one inner core comprises a single inner core, wherein said at least one gain region comprises a plurality of gain regions grouped into a plurality of groups, and wherein the groups of gain regions are lobed about said inner core.

23. A fiber amplifier according to claim 13, wherein said fiber amplifier has a rectangular cross-sectional shape and defines a lateral axis, wherein said at least one inner core comprises a plurality of inner cores, wherein said at least one gain region comprises a plurality of gain regions, wherein said gain regions are disposed along the lateral axis, and wherein said inner cores are interspersed between gain regions.

24. A fiber amplifier according to claim 13, wherein said inner cores and said gain regions are spaced apart from one another.

25. A fiber amplifier according to claim 13, wherein said inner cores and said gain regions are disposed proximate one another.

26. A fiber amplifier according to claim 13 further comprising a photonic gap material surrounding said at least one inner core and disposed between said at least one inner core and said at least one gain region.

* * * * *